Aug. 14, 1945.   W. STELZER   2,382,268
HYDRAULIC BRAKE
Filed Oct. 15, 1942   3 Sheets-Sheet 1

INVENTOR.
William Stelzer

Aug. 14, 1945.    W. STELZER    2,382,268
HYDRAULIC BRAKE
Filed Oct. 15, 1942    3 Sheets-Sheet 3

INVENTOR.
William Stelzer

Patented Aug. 14, 1945

2,382,268

UNITED STATES PATENT OFFICE 2,382,268

HYDRAULIC BRAKE

William Stelzer, Detroit, Mich.

Application October 15, 1942, Serial No. 462,067

3 Claims. (Cl. 188—152)

The invention relates to hydraulic brakes and more particularly to a torque-responsive hydraulic brake for vehicles where the brake torque is utilized to provide a booster action and where the "pedal feel" is proportionate to the braking effect.

In devising present day boosters for hydraulic brakes it has been the aim to obtain a construction where the effort to expand the brake shoes is in a constant and pre-determined proportion to the effort exerted by the operator on the brake pedal in order to obtain a desired "pedal feel." While a certain modulation is thereby obtained it does not take into account the effect of the brakes. Assuming that one brake is dry, and another wet, or that one brake is more or less effective for one reason or another, a very serious unbalance may result even though the brakes are inherently equalized due to the hydraulic operation, which unbalance is frequently the cause of accidents.

The object of my invention is a departure from the conventional requirement, to obtain a brake where the pedal pressure is in proportion to the braking effect, and where not the force to expand the brake shoes, but the braking effect is equalized.

Another object is to obtain a construction where the brake torque is utilized to create a booster action to reduce the necessary exertion by the operator.

A further object of the invention is to eliminate the danger of a grabbing brake caused by variations in the coefficient of friction of the brake linings, by providing a construction where the shoes are automatically released until the brake torque is equal to that in the other wheels of the vehicle.

It is also the aim of this invention to effect an efficient booster action inherent in the brake itself, and without the help of intricate and expensive booster mechanisms which require a special source of power.

An important aim is to simplify the construction of hydraulic brakes and to thereby reduce the cost of manufacturing and to increase their dependability and usefulness.

Yet another aim is to provide automatic releasing means to prevent grabbing of the brakes and to enable the use of self-energizing brake shoes which provide a booster action.

Other objects and advantages of this invention will be apparent from the following detailed description considered in connection with the accompanying drawings submitted for the purpose of illustration and not to define the scope of the invention, reference being had for that purpose to the subjoined claims. In the drawings, wherein similar reference characters refer to similar parts throughout the several views:

Figure 3:
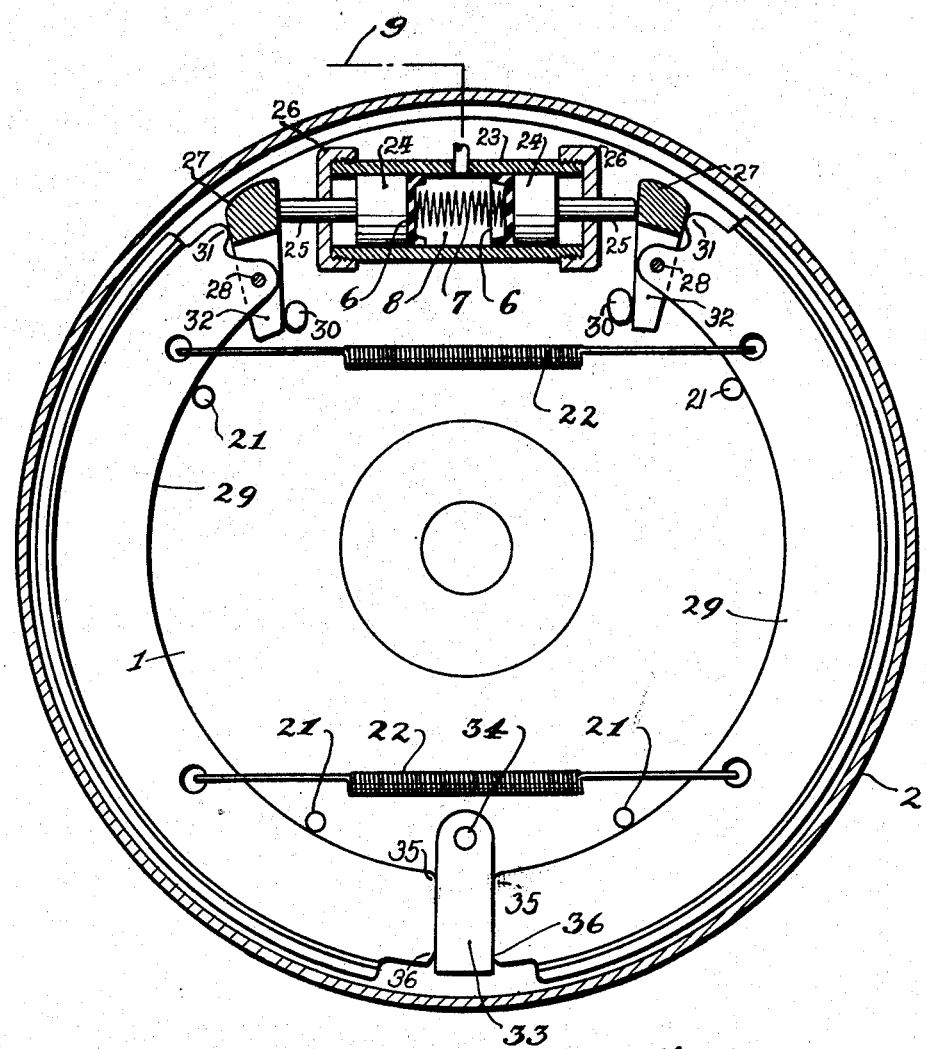

Fig. 3, a side elevation partly in section of a modified brake; and

Figure 4:
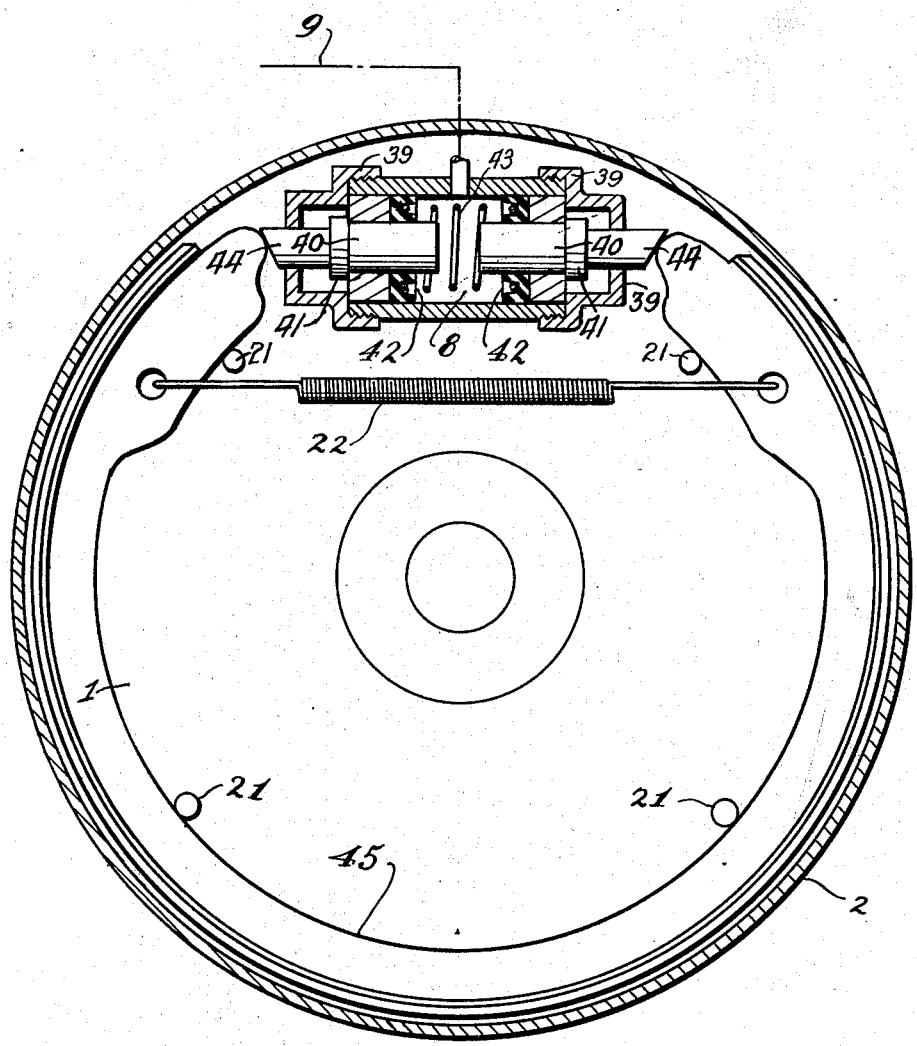

Fig. 4, a side elevation partly in section showing a further modification.

Before explaining the present invention in detail, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not for limitation.

Describing the invention now in detail, there is shown a brake arrangement for a wheel of a vehicle, where 1 designates the usual backing plate to which the various non-rotating elements are attached, and 2 represents the brake drum which revolves with the wheel. Secured to the backing plate is a wheel cylinder or brake actuator 3 in which slide pistons 4 and 5 having piston seals 6 held in contact with said pistons by a spring 7 in chamber 8, the latter being in communication with the master cylinder or other pressure producing device through a brake line 9. Pistons 4 and 5 have piston rods 10 and 11 engaging lever 12 and brake shoe 13 respectively. Piston rod 11 has a cap 14 attached thereto serving as stop in the retracted or "off" position. Piston rod 10 carries a seal 15. The wheel cylinder is shown only diagrammatically, such conventional parts as dust covers, adjusting members for brake wear, and bleeding devices, being left off in order to illustrate the invention more clearly. Lever 12 is fulcrumed on an anchorage pin 16 attached to the backing plate, and rests against a solid stop 17 also extending from backing plate 1. Brake shoe 18 engages lever 12 at 19. Both brake shoes are hinged together at 20 so that nothing prevents them from rotating except lever 12 and cap 14. The contractile movement of said brake shoes is limited by stop pins 21 extending from backing plate 1, whereby the brake shoes are held a certain distance from the brake drum by retraction springs 22.

While the embodiment described is suitable where a booster effect is required primarily for forward travel, in vehicles where the brakes should be equally effective when going backwards, the modified brake shown in Fig. 3 may be used.

In the entirely symmetrical arrangement the wheel cylinder 23 attached to backing plate 1 has pistons 24 whose piston rods 25 are guided to slide in end caps 26 secured to wheel cylinder 23.

Piston rods 25 engage levers 27 pivoted at 28 to shoes 29 and at their other extremity resting against anchor pins 30 secured to backing plate 1. The shoes also engage levers 27 at 31. Said levers are shown in section, whereby 32 represents a slot to accommodate the web of brake shoe 29. At the bottom of the brake I provide a pry or booster and centralizing lever 33 pivoted to the backing plate at 34. This lever is intermediate the two brake shoes and engages them on the surface between points 35 and 36.

The same principle illustrated in Fig. 3 is carried out by hydraulic means in Fig. 4. In this embodiment cylinder 37 contains pistons 38 resting against end caps 39 and within which slide smaller pistons 40 having shoulders 41 to abut against pistons 38 provided with seals 42 serving both the large and small pistons. A spring 43 holds them in engagement. The piston rods 44 of pistons 40 contact brake shoe 45 whose web is smaller in section to give it sufficient elasticity to be capable of expanding to contact the brake drum during a brake application.

Figure 2:
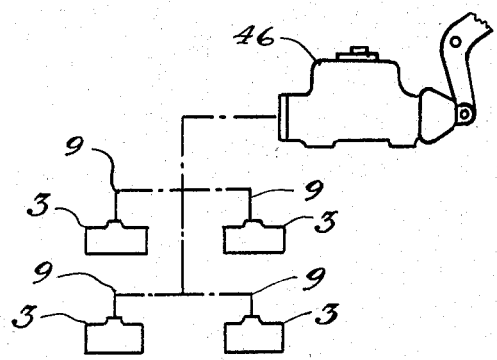
Fig. 2, is a diagram to show the connection between a plurality of wheel cylinders.

Having thus described the invention, I shall now explain the operation of the same. All the views show the "off" or released position. The braking systems usually consist of a plurality of wheel cylinders, and a master cylinder or other fluid pressure producing device 46, connected as illustrated in Fig. 2.

Figure 1:
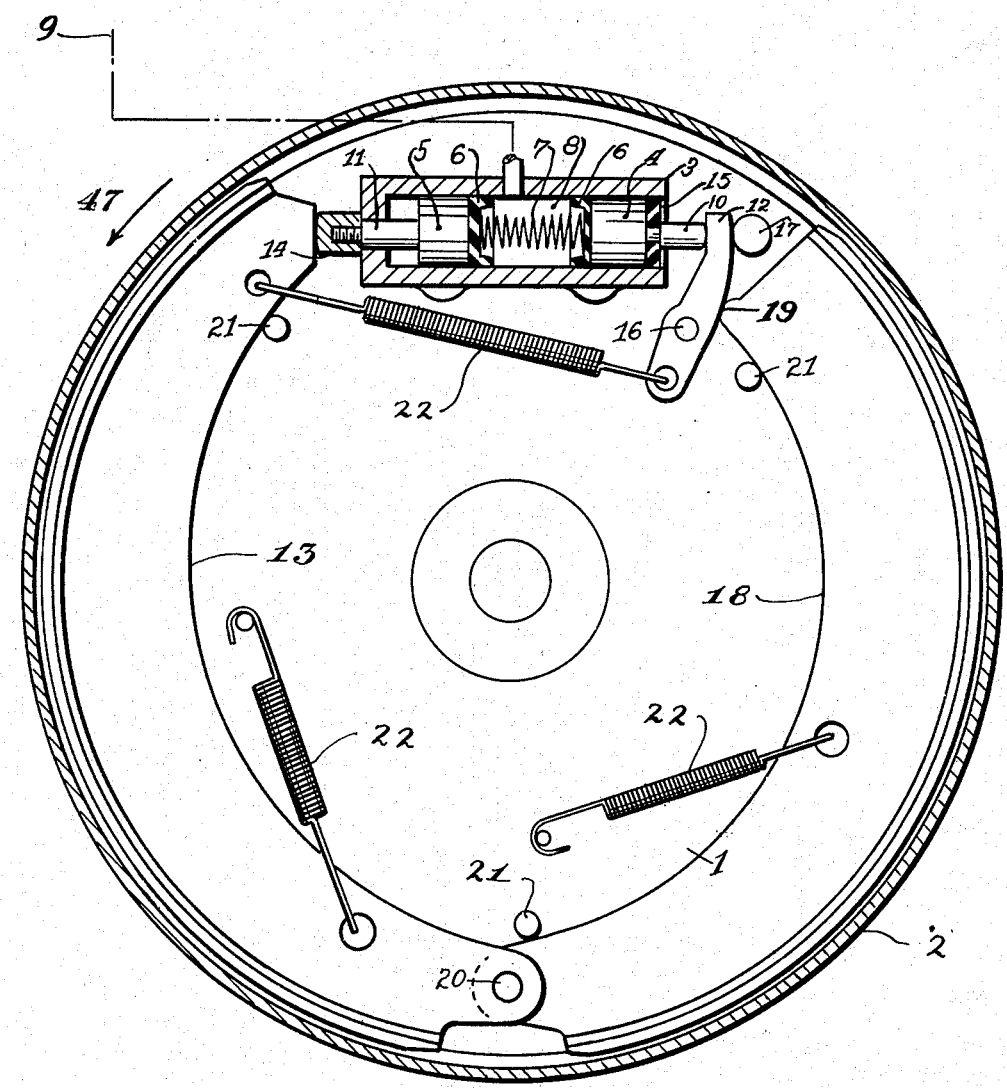
Fig. 1 is a side elevation of a brake built according to the novel principle, where the wheel cylinder is shown in section, and where the wheel is removed to provide an unencumbered view of the brake actuating elements.

Assuming that the operator depresses the brake pedal to apply the brakes, a pressure is produced in chamber 8, reference being had to Fig. 1. Since lever 12 rests against stop pin 17, only piston 5 is able to move, pushing the tip of brake shoe 13 against brake drum 2 revolving in the direction indicated by arrow 47. As soon as brake shoe 13 is brought into contact with the brake drum, the brake torque resulting from the friction between the brake shoes and the rotating drum is transmitted to react against lever 12 at point 19. Lever 12 in turn transmits the brake torque to act on piston 4 through piston rod 10. The force acting on lever 12 includes the force of application produced by piston 5. It will be seen that due to the ratio of lever 12 the force acting on point 19 must exceed a certain multiple of the hydraulic pressure in chamber 8 before piston 4 is forced into cylinder 3 to displace fluid in chamber 8, said fluid displaced being transmitted to further apply piston 5 either in the same brake or in the other brakes of the vehicle. It is thus obvious that the proportion of lever 12 governs the booster ratio of the brake. While the booster ratio is governed by lever 12, the boosting action itself is produced by the friction members 13 and 18, receiving the energy from the rotating brake drum 2. If the friction of brake shoes 13 and 18 is small for one reason or another, as for instance due to a glazing of the friction surfaces, or due to dirt or grease, the brake torque produced may not be sufficient to move lever 12, but due to the self-energizing or servo-action of the brake shoes the brake action is allowed to build up to reach the maximum obtainable under the circumstances. On the other hand, if the coefficient of friction of the brake shoes is high, as may result from moisture, the brake torque is increased whereby lever 12 is moved away from stop 17, turning about pivot 16 and pushing piston 4 against the pressure of the hydraulic fluid in chamber 8. The brake actuator is so proportioned, that piston 5 reaches the end of its stroke before lever 12 touches cylinder 3. This is necessary because arresting of lever 12 would defeat the modulating action of the brake. After piston 5 is seated on the bottom of cylinder 3, piston 4 continues to hold the brake in engagement, where the brake acts as an unwrapping brake and the torque is transmitted partly to oppose the hydraulic fluid in chamber 8 and partly to pivot pin 16. In this position any grabbing of the brake or increase in the braking effect that is not the result of an increased manual effort to apply the brakes, causes brake shoe 13 to break away from piston rod 11, whereby the servo-action and with it the braking effect is immediately reduced, until the latter is in a pre-determined proportion to the hydraulic pressure or manual brake effort. Thus it is apparent that lever 12 in combination with piston 4 serves as a brake torque relieving means to keep the brake torque in a pre-determined relation to the operating pressure of the hydraulic fluid, or to limit the braking effect so that it is in proportion to the braking effort. Supposing now that the operator releases the brake pedal, the hydraulic pressure in chamber 8 is relieved, whereby the concerted effort of springs 22 retract the brake shoes to the off position as shown in Fig. 1, where the brake shoes are disengaged from the drum.

When the brake is applied while the vehicle is going backwardly, it is less effective because the brake torque opposes piston 5, while piston 4 remains idle because lever 12 rests against stop 17.

In the construction in Fig. 3 the operation is similar to that of the construction just described, except that the operation is the same for forward or backward travel of the vehicle, because the construction is entirely symmetrical.

Supposing a hydraulic pressure is produced in chamber 8 by a pressure producing device such as master cylinder 46 operated by the operator, pistons 24 are pushed apart to bring the brake shoes 29 into contact with the brake drum 2. Levers 27 abutting against points 31 serve only as intermediate members to transmit the force of application directly to the brake shoes. As soon as the latter come into contact with the rotating brake drum a brake torque is produced urging said shoes to revolve in the same direction as brake drum 2.

For this example, it is assumed that the rotation of the brake drum is clockwise as viewed on the drawings. The elements arranged symmetrically will be referred to as right or left. The right hand brake shoe, by revolving a short distance with said brake drum, pushes the lower extremity of link or lever 33 towards the left so that it pivots about anchor pin 34 and advances the left brake shoe in a clockwise rotation but at a faster pace than that of the right shoe, because the latter engages link 33 at 35, whereas the left shoe is engaged at 36 where the travel is greater. Thus link 33 provides a certain booster action because by virtue of its function the left hand piston 24 travels faster to the right to enter cylinder 23 than the right hand piston which moves also to the right. The pace of the left hand piston 24 is further speeded up as soon as the lower extremity of the left lever 27 stops against anchor pin 30 and point 31 loses contact with lever 27. The brake actuating mechanism is so proportioned that the right hand piston bottoms against cap 26 before lever 27 on the left side touches the left cap 26. The same is true in the opposite direction. Supposing that the brake torque is sufficient to overcome the resistance offered by the hydraulic fluid under pressure in chamber 8, the movement of pistons 24 continues until the right hand piston rests against cap 26. Further movement of the right hand shoe would result in the release of the brake shoes and consequent relief of the brake torque. It is therefore obvious that the brake torque cannot increase unless the hydraulic operating pressure is increased proportionately. It will be observed that anchor studs 30 are oblong in shape. This is intended to provide a change in leverage in levers 27 whereby the lever ratio increases while approaching cap 26. This feature results in a greater booster ratio for a maximum braking effect, and a smaller booster ratio for a smaller braking effect. Since the booster ratio is on an increasing scale the mechanism may come to an equilibrium before the right hand piston comes to rest against cap 26, unless the coefficient of friction reaches a value above average.

Supposing now that the operator releases the brake pedal and that the hydraulic operating pressure is therefore relieved, springs 22 immediately retract shoes 29 so that they rest against locating pins 21. Link 33 during the retractile movement serves as an automatic centering means because spring 22 tends to pull the shoes together to a position where the distance between them is shortest, which is the case when link 33 is in a central position and all points 35 and 36 are bearing.

It is logical that the function is similar to that described when brake drum 2 is revolving in the opposite direction, because the construction is symmetrical.

Describing the operation of the construction shown in Fig. 4, it is again assumed that the brake drum revolves in a clockwise rotation. When the hydraulic operating pressure is applied to engage the brakes, the hydraulic pressure in chamber 8 expands pistons 40 in opposite directions until brake shoe 45 is forced into contact with the brake drum. As soon as this occurs, a brake torque is produced as shoe 45 is urged to revolve with the brake drum in a clockwise direction. The brake torque produced is transmitted to act on piston rod 44 at the left, causing the left hand piston 40 to move to the right, i. e., to enter chamber 8 until shoulder 41 abuts against the left piston 38. Further movement to the right is resisted by the fluid pressure acting on piston 38. If the coefficient of friction of the brake shoe is high, resulting in a higher brake torque, piston 38 is overpowered so that on the left side pistons 40 and 38 move to enter chamber 8 in unison, and on the right hand side piston 40 moves out of the cylinder until shoulder 41 comes to rest against cap 39. On the left hand side the brake shoe continues to act on piston 40 and 38 but further advance into cylinder 37 is stopped because any advance causes shoe 45 to move away from piston rod 44 at the right hand side, thus releasing the brake shoe, with a resultant decrease in brake torque which is immediately overpowered by the hydraulic pressure in chamber 8, so that the shoe at the right hand side becomes engaged again with piston rod 44 and the shoe is pressed harder against the brake drum. The brake mechanism assumes a balanced or holding position where shoulder 41 rests against piston 38 with a variable pressure. The latter is high if the coefficient of friction of the friction member 45 is high, and low if its coefficient of friction is low. In the latter case, a greater force is applied to the right hand tip of the brake shoe. When the operator releases the brake pedal and the operating pressure in chamber 8 drops, spring 22 as well as the inherent resiliency of shoe 45 contract the latter to assume the "off" position determined by stop pins 21. Furthermore, the tips of the shoe are equidistanced from cylinder 37 by virtue of spring 43.

It is apparent that the function is similar to that described when the brake drum revolves counterclockwise.

While the motive fluid preferably consists of hydraulic brake fluid, compressed air or any other suitable agent may be used.

The invention may also be applied to other devices, as for instance to clutches, or transmission brakes.

I claim:

1. A brake comprising a revolving member to turn with a wheel, a pair of brake shoes arranged to engage said revolving member during a brake application, a hydraulic actuator cylinder intermediate said brake shoes, hydraulic fluid to operate said actuator, manual means to put said hydraulic fluid under pressure, a pair of opposed pistons in said actuator cylinder, a lever intermediate each shoe and piston and operative in response to the brake torque, said lever being of the two arm type where the brake torque acts against said lever at an intermediate point and is opposed by one of said pistons acting at one end of said lever and by a fixed reaction point at the other end of said lever, and means to render said lever ineffective upon movement of the actuating piston to engage the energizing end of said brake shoes with said revolving member.

2. The construction as claimed in claim 1 where said levers are arranged to rest against said brake shoes after the force exerted by said brake shoes on said intermediate point yields to the force exerted by said pistons.

3. The construction as claimed in claim 1 where said fixed reaction point is on an anchor member where the point of contact between said lever and said anchor member changes with the position of said lever to provide an increasing lever ratio, whereby said lever ratio increases as said piston yields.

WILLIAM STELZER.